Figures 1, 2, 3, 4:
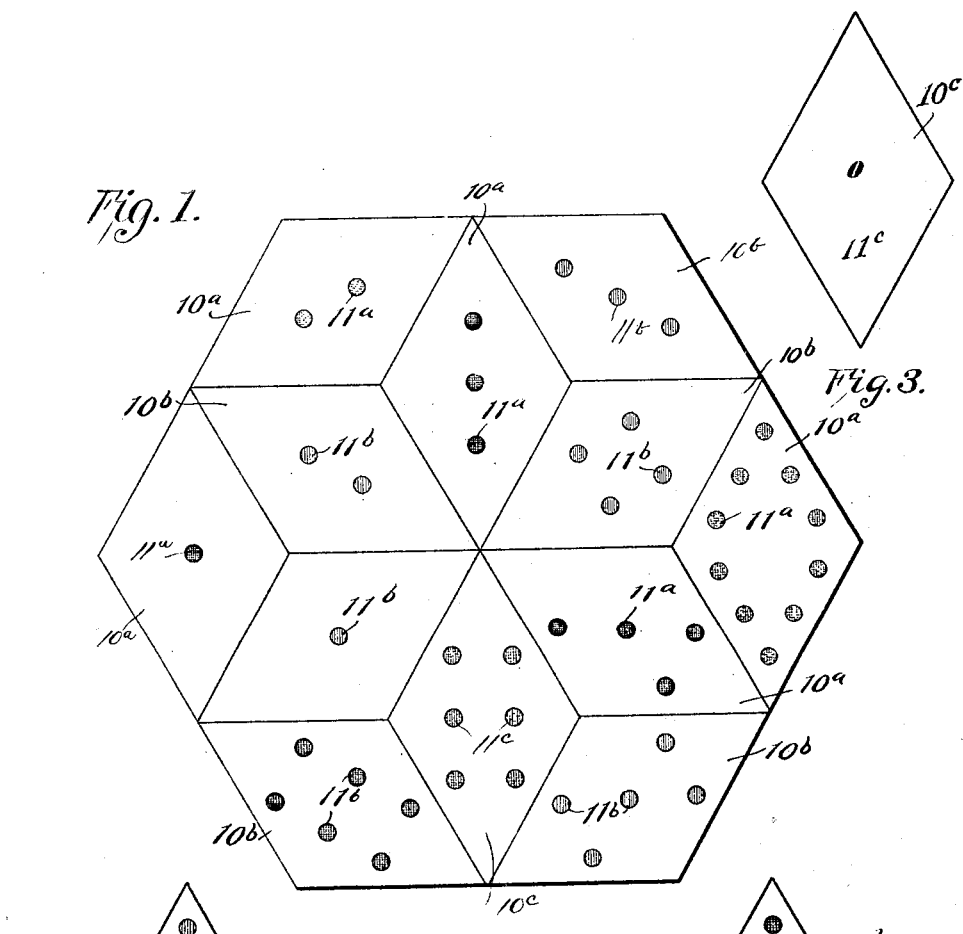

J. F. DREYER.
GAME APPARATUS.
APPLICATION FILED MAR. 5, 1912.

1,121,989.

Patented Dec. 22, 1914.

Inventor
J. F. Dreyer,
By Victor J. Evans
Attorney

Witnesses
Carroll Bailey.

UNITED STATES PATENT OFFICE.

JAMES F. DREYER, OF FRANKFORT, INDIANA.

GAME APPARATUS.

1,121,989.   Specification of Letters Patent.   Patented Dec. 22, 1914.

Application filed March 5, 1912. Serial No. 681,689.

*To all whom it may concern:*

Be it known that I, JAMES F. DREYER, a citizen of the United States, residing at Frankfort, in the county of Clinton and State of Indiana, have invented new and useful Improvements in Game Apparatus, of which the following is a specification.

My invention relates to new and useful improvements in game apparatus and has for its object to provide a parlor game for the entertainment of young folks at home and for social gatherings. With this object in view I have added new features that will produce almost innumerable changes, and surprising results, in the finishing plays which makes the game very attractive and exciting.

Specifically stated the game consists in the use of a plurality of diamond shaped blocks, provided with colored characters, preferably in the form of round or oblong pips denoting the number of the various blocks, the colors of the pips serving to distinguish the blocks of the competing players. The game consists in playing the blocks on the table in a manner so as to fill up a complete hexagon wherein the numbers on the blocks constituting the star within the hexagon must be in consecutive order from one to six, reading from the left to right, while the numbers on the blocks placed between the points of the star must be in the same order, with one possible exception which is hereinafter to be explained in the further description of the manner of completing the game.

In the drawing forming a part of this application like numerals of reference indicate similar parts in the several views, and in which:

Figure 1 is a plan view of a completed hexagon made with blocks of the game apparatus, showing one manner of arranging the same. Fig. 2 is a block having five black and five red pips arranged thereon. Fig. 3 is a neutral block having the character of naught or zero. Fig. 4 is the highest block of one of the players having twenty black pips.

The game apparatus consists of a plurality of diamond shaped blocks all of the same size and color provided with characters denoting the number of the block, except one block which has the character of naught or zero. The characters are colored, red, black and yellow being used in this description to distinguish the blocks of the competing players, as for instance the block $10^a$ provided with black pips $11^a$, would represent one of the players, the block $10^b$ provided with red pips $11^b$, would represent the other player, while the block $10^c$ provided with yellow characters or pips $11^c$ constitute neutral blocks as they do not properly belong to either player.

The game apparatus consists of sixty diamond shaped blocks differing from each other in the following manner: There are twenty-four blocks having black pips, and twenty-four blocks having red pips described as follows: one block with ten black pips and one block with ten red pips, one block with twenty black pips and one block with twenty red pips, three blocks with one black pip and three blocks with one red pip, four blocks with two black pips and four blocks with two red pips, four blocks with three black pips and four blocks with three red pips, four blocks with four black pips and four blocks with four red pips, four blocks with five black pips and four blocks with five red pips, and four blocks with six black pips and four blocks with six red pips, making a total of fifty blocks. There are two additional blocks each having five black and five red pips as shown in Fig. 5. There are also one block each of number 1, 2, 3, 4, 5, 10 and 20 having yellow pips, and one block having the character of naught or zero. The blocks having red pips and the blocks having black pips represent the competing players, and before beginning to play the players must decide which shall play for the black and which shall play for the red, for as the game proceeds all points that are made with blocks having black pips count for the player that is playing for black and all points that are made with blocks having red pips count for the player that is playing for red. In playing the game the blocks are placed on the table in such a manner as to form a hexagon of twelve blocks, each player in turn playing three times if he can. The blocks must be initially arranged to form a star, said blocks being in consecutive order, according to the number of pips on the blocks from one to six, reading clockwise as clearly illustrated in Fig. 1, the additional blocks being then arranged between the extremities of the star to complete the hexagon.

The game may be played by two, four, six or eight persons but in this description I will represent the game as being played by two persons A and B. The blocks are all placed on the table, face down and thoroughly mixed. They are then pushed to one side of the table where the players may draw. Now if by agreement A is to play for the black he will endeavor to play the black as far as possible, and when an opportunity occurs to take or win from B blocks having red tips. Likewise B will endeavor to play his own color as far as possible and to win from A blocks having black pips. It must be borne in mind that all blocks having either black or red pips, numbering from one to six inclusive, have a full value of five points and that these blocks are called five point blocks and that blocks having either black or red pips numbering ten or twenty will win or take five point blocks from their opponent. The player now draws five blocks and places them before him with the faces of the blocks concealed from his opponent. If however he has drawn any of his opponent's five point blocks he must turn them face up, just in front of his other blocks. This rule must be observed throughout the game, that each player must keep all five point blocks of his opponent's in plain view. Either A or B may lead, and if A leads he shall begin by placing near the center of the table, any block that is eligible to a place in the star which would be any block numbering from one to six and having any color of pips. This play is followed by placing on each side of the block already played, point to point, a block of the next highest number to the right or a block of the next lower number to the left, so that, when the star is complete the blocks will be consecutive in order from one to six, reading clockwise. Each player has the privilege of three plays, if he can play but is not required to play more than once. The next player then plays, and it will be seen that he has two places he can play, either to the right or to the left of the block or blocks that A has played, and he must play such blocks as would be in consecutive order as described. He also has the privilege of three plays. If he cannot play he must draw until he can play not to exceed three draws. If he cannot then play he passes. He may, however, decline to play from the blocks he has before him that would play, and draw. If in drawing, he should draw a five point block of his opponent's he must immediately play it and cease drawing. The player cannot draw after playing once. The player is often compelled to play a block of his opponent's and when a block is so played it counts for his opponent. Now instead of playing his opponent's block, he might have a neutral block, that is a block having yellow pips that would play and he could play it, and as the player always has the privilege of three plays, this play might enable him to follow up with other good plays.

When the star is completed blocks must be placed between the points of the star in such manner as to form a hexagon, beginning with any number from one to six, to be followed by placing a block of the next highest number in the space to the left of such block already played or a block of the next lower number in the space to the right, with a view of having the blocks in the same consecutive order as the blocks in the star. Now when five of these spaces have been filled and only one space remains, the player whose turn it is to play, may play a block known as a "special", if he has such a special and wishes to play it, these specials being blocks number ten and twenty having either black or red pips, while blocks having both red and black pips are known as mixed specials. This space may be filled either by a special or by the block that would belong to this space in regular order, but the last space to be filled in completing the hexagon is the only space that a special can be played. If a ten or twenty point special is played in this space it will take all five point blocks of its opponent's that have been played in the hexagon.

Referring to the views it will be noted that A is playing for the black, or blocks $10^a$ provided with black pips $11^a$, and that B is playing for the red, or blocks $10^b$ provided with red pips $11^b$, and that the blocks $10^c$ provided with yellow pips $11^c$ are neutrals. In Fig. 1 A has played a ten point special to complete a hexagon, for under the rules, a special can only be played as the last block in the hexagon. Of the eleven blocks that have been previously played four belonged to A, six belonged to B and one was a neutral. The ten point special that A played thus took or won the six five point blocks belonging to B, giving A ten five point blocks which together with the ten points of the special gave A the entire hexagon of sixty points. Obviously if A had played a twenty point special instead of a ten point special the result would have been seventy points. Or if A had played a block having black pips instead of the special, it being the block number four, or a five point block, then A would have had twenty-five points in the hexagon and B would have had thirty points. Three hexagons are thus built up, for which other plays may be made which may change the results, for no points that are made in the progress of the game can be counted as described until the final play is made. The two blocks each having five black pips and five red pips which seem to make five points for A and five points for B when played, but as these values would balance they are not counted, unless by the influence of other plays that are given a higher value. These blocks containing different color pips of the competing players are known as "mixed specials," and like the number ten and twenty specials they can only be played as the last block in completing the hexagon. Now to explain the use of these blocks it will be observed that three hexagons are built up and perhaps a special has been played in each of them. If a twenty point special has been played in one hexagon and a mixed special has been played in another one of them, then the mixed special by the influence of the twenty point special will be raised to a value of ten points, corresponding to the color of the pips of the twenty point special. It might here be stated that the blocks having yellow characters or pips have no other value as to points. The mixed special then having a value of ten points will take the hexagon under the same rule as A took the hexagon as shown in the views. If A had played a twenty-point special in one hexagon, B a twenty point special in another hexagon, while in the third hexagon a mixed special had been played then the mixed special would not be affected for the reason that the influence of the competing twenty point specials would counter-balance each other.

After three hexagons have been completed there are four plays that would likely change the whole aspect of the game. Neutrals will be introduced, though having no value as to points, have the power to take or annul points that have been made. They are played on the top of the hexagon and if a special has been played in the hexagon they will be placed directly on top of such special. Only four of the neutral blocks are used in this capacity and described as follows: a block having five yellow pips, a block having ten yellow pips, a block having twenty yellow pips, and a block having yellow characters naught or zero. A neutral number five may be played on the top of any hexagon in which there is no block of a higher value than five points, and when so played, it will take, for the one playing it, all points that have been made in the hexagon. Thus if A plays a neutral number 5 on top of a hexagon in which he may have a number of five point blocks, and B a number of five point blocks, the neutral will take all of B's blocks giving A the entire hexagon. A number 10 neutral may be played on top of any hexagon, except one in which a twenty point special has been played, and when so played it will take such hexagon for the one playing it. This would include a hexagon in which a number five neutral had been played, thus B could play a number ten neutral on top of the neutral that A had played and take the hexagon from A. A number twenty neutral may be played on top of any hexagon and take the hexagon for the one playing it. This would include the hexagon on which number five and number ten had been played. Thus A could play a number twenty on top of a number ten that B had played and retake the hexagon from B. If a mixed special has been played in the hexagon and the hexagon then taken by a twenty point special in another hexagon, the number twenty neutral played on top of such twenty point special would take both hexagons. The influence of the number twenty neutral will extend as far as the influence of the twenty point special. The last play that can be made is a block having a yellow character of naught or zero called a nullifier for it has the power to annul all points that have been made on the hexagon in which it is played. It may be played on top of any hexagon which would include the hexagon on which the blocks number five, ten and twenty have been played. Thus B could play the nullifier on top of number twenty that A had played and annul or destroy the entire hexagon. If the nullifier is played on top of a twenty point special it will annul the hexagon in which the twenty point special has been played and also such other hexagon or hexagons that the twenty point special may have taken. The influence of the nullifier will extend as far as the influence of the twenty point special. The last four plays must be made from the blocks that the players hold when the three hexagons have been completed for the drawing then ceases. The plays must be made in the order named if made at all. If a player holds a block number five and does not wish to play he shall announce to the other players that he holds such a block and that he will not play. The next block to play is number ten and if number ten is not played number twenty is played. Then lastly the nullifier. The final count is now made and the player that has the most points in the three hexagons is the winner of the game. If the players choose to add this feature, they may require each player to turn down all blocks that have not been played, and all five point blocks that each player has drawn of his own color and has failed to play shall be counted for his opponent. If this feature is made a part of the game it must be so decided before the game begins. Also if the players wish to do so they may agree on a certain number of points to constitute a game, such as three hundred or five hundred, and in such case it will require more than one count to complete the game.

Having fully described my invention, what I claim as new and useful is:—

1. A game apparatus comprising a plurality of diamond shaped blocks, each having one or more pips thereon, except one block having the character of zero, and said pips being of different color to divide said blocks into independent series.

2. A game apparatus comprising a plurality of diamond shaped blocks having one or more pips thereon, said pips being colored to represent the competing players, and neutral blocks having still different colors of pips thereon.

3. A game apparatus comprising a plurality of diamond shaped blocks having one or more pips thereon, except one block having the character of naught or zero, said pips being of different colors to represent the competing players, and neutral blocks having various numbers of pips thereon of a still different color.

4. A game apparatus comprising a plurality of diamond shaped blocks having one or more pips thereon, said pips being of different colors to represent the competing players, and other blocks each having pips of both of the competing players.

5. A game apparatus comprising a series of diamond shaped blocks, said blocks having various numbers of pips, the pips being colored to represent the blocks of the competing players, neutral blocks having a still different color of pips, and still other blocks each having pips of both of the competing players.

In testimony whereof I affix my signature in presence of two witnesses.

JAMES F. DREYER.

Witnesses:
MARSHALL THATCHER,
EDWARD F. BEALL.

Copies of this patent may be obtained for five cents each, by addressing the "Commissioner of Patents, Washington, D. C."